(No Model.)

T. S. FEFEL.
FISHING FLOAT.

No. 551,857. Patented Dec. 24, 1895.

Witnesses:
Charles W. Mil-
holland.
John W. Wittman

Inventor:
Thomas Swann Fefel
per
A. S. Milholland
Attorney

UNITED STATES PATENT OFFICE.

THOMAS SWANN FEFEL, OF BALTIMORE, MARYLAND, ASSIGNOR OF ONE-HALF TO CHARLES RIDGELY PUE, OF SAME PLACE.

FISHING-FLOAT.

SPECIFICATION forming part of Letters Patent No. 551,857, dated December 24, 1895.

Application filed June 4, 1895. Serial No. 551,698. (No model.)

*To all whom it may concern:*

Be it known that I, THOMAS SWANN FEFEL, a citizen of the United States, residing in the city of Baltimore, Maryland, have invented a new and useful Improvement in Fishing-Floats, of which the following is a specification.

My invention has for its object to provide a simple means of attachment for the float to the line so as to render its attachment to or detachment from the line a very simple matter and to enable this to be done without detaching the line from the rod.

Figure 1:
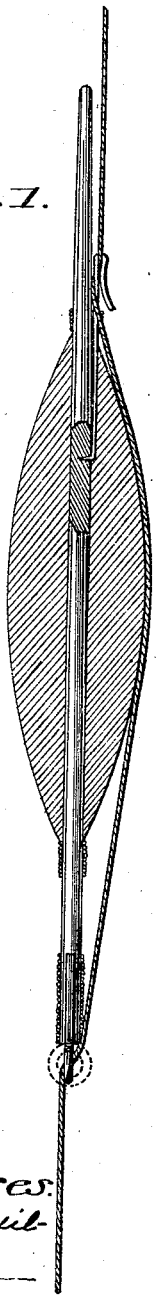
Figure 3:
Figure 2:
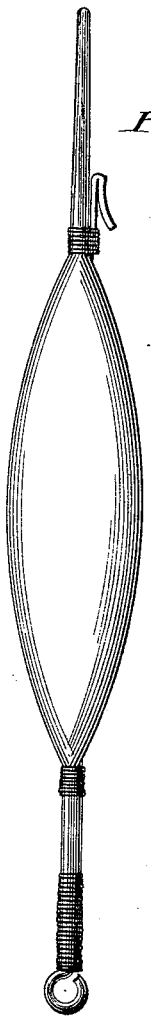

In the accompanying drawings, Figure 1 is a sectional view of the invention. Fig. 2 is an elevation. Fig. 3 is a detail showing the attachment for the upper end of the float.

The float shown is of ordinary construction and has a central spindle or stem, which is provided at its lower end with a movable eye made of wire, the end of the eye extending into an opening in the stem and adapted to turn therein. The end of the wire is bent over to form the eye, leaving an opening, as shown in Fig. 2, and the stem of the eye is arranged eccentrically to the stem of the float, so that after the line is inserted through the opening in the eye, as shown in Fig. 1, the eye is given a quarter-turn, which closes the opening by bringing the end of the wire forming the eye in contact with the end of the stem or the float, and thus there is no danger of the line becoming disconnected as the strain upon it tends to keep the eye in the position in which the opening thereto is closed. This strain of the line if increased only tends to force the end of the eye tighter against the shoulder or bearing on the end of the stem and it is only necessary for the fisherman to insert the line through the eye from the proper side. If inserted through the other side the tendency would be when strain is applied to the line to turn the eye to open position.

The attachment at the upper end consists of a strip of wire with a barb on its lower end and this is inserted between the float and the stem, the barb being embedded in the stem. The upper end projects alongside of this stem and is bent over into the form of a hook, as shown. The line is given a turn between the stem and the wire and passes between the parts of the hook and is thus securely held in place, while at the same time it is free to be adjusted.

I claim—

In combination with a fishing float, an attachment for the upper end thereof, comprising a wire secured alongside of the stem with a hooked upper end, said wire extending between the float and stem and having a barb at its lower end embedded in the stem, substantially as described.

THOMAS SWANN FEFEL.

Witnesses:
CHAS. W. MILHOLLAND,
WM. H. JONES.